United States Patent
Kawanishi et al.

(10) Patent No.: US 7,936,996 B2
(45) Date of Patent: *May 3, 2011

(54) AUTOMATIC ADJUSTING SYSTEM OF FREQUENCY SHIFT KEYING MODULATOR

(75) Inventors: Tetsuya Kawanishi, Tokyo (JP); Masayuki Izutsu, Tokyo (JP); Takahide Sakamoto, Tokyo (JP); Masahiro Tsuchiya, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 572 days.

This patent is subject to a terminal disclaimer.

(21) Appl. No.: 12/064,631

(22) PCT Filed: Aug. 23, 2006

(86) PCT No.: PCT/JP2006/316505
§ 371 (c)(1),
(2), (4) Date: Feb. 23, 2008

(87) PCT Pub. No.: WO2007/023858
PCT Pub. Date: Mar. 1, 2007

(65) Prior Publication Data
US 2009/0041472 A1    Feb. 12, 2009

(30) Foreign Application Priority Data
Aug. 24, 2005 (JP) ................... 2005-242516

(51) Int. Cl.
H04B 10/04    (2006.01)
(52) U.S. Cl. ........ 398/186; 398/187; 398/192; 398/195; 398/198

(58) Field of Classification Search .................. 398/192, 398/186–188, 195, 197, 198
See application file for complete search history.

(56) References Cited

U.S. PATENT DOCUMENTS

| | | | |
|---|---|---|---|
| 6,219,469 | B1 | 4/2001 | Minakata et al. |
| 6,411,747 | B2 | 6/2002 | Rangaraj |
| 6,556,727 | B2 | 4/2003 | Minakata et al. |
| 6,674,565 | B2 | 1/2004 | Kondo et al. |

(Continued)

FOREIGN PATENT DOCUMENTS

JP    63-005306    1/1988

(Continued)

OTHER PUBLICATIONS

Kiuchi et al., "High Extinction Ratio Mach-Zehnder Modulator Applied to a Highly Stable Optical Signal Generator," IEEE Transactions on Microwave Theory and Techniques, IEEE Service Center, Piscataway, NJ, US, vol. 55, No. 9, Sep. 1, 2007, pp. 1964-1972m.

(Continued)

*Primary Examiner* — Ken N Vanderpuye
*Assistant Examiner* — Hibret A Woldekidan
(74) *Attorney, Agent, or Firm* — Ostrager Chong Flaherty & Broitman P.C.

(57) ABSTRACT

An optical modulator achieving high extinction ratio and an optical modulator system. By a control system performing an adjustment method comprising predetermined steps by applying a bias voltage daringly to a modulation electrode for switching the USB signal and LSB signal of an established optical SSB modulator or optical FSK modulator, a means for adjusting bias voltage applied to each bias electrode preferably automatically is provided and a bias point where the extinction ratio of an optical modulator is maximized can be obtained.

6 Claims, 3 Drawing Sheets

U.S. PATENT DOCUMENTS

| | | | |
|---|---|---|---|
| 7,239,763 B2 * | 7/2007 | Kawanishi et al. | 385/1 |
| 7,245,787 B2 * | 7/2007 | Kawanishi et al. | 385/1 |
| 7,302,120 B2 * | 11/2007 | Sakane et al. | 385/3 |
| 7,711,215 B2 * | 5/2010 | Kawanishi et al. | 385/3 |
| 7,817,923 B2 * | 10/2010 | Akiyama et al. | 398/188 |
| 7,840,141 B2 * | 11/2010 | Tanaka et al. | 398/198 |
| 7,848,659 B2 * | 12/2010 | Miura et al. | 398/188 |
| 2001/0008569 A1 | 7/2001 | Rangary | |
| 2002/0048076 A1 | 4/2002 | Kondo et al. | |
| 2002/0080454 A1 * | 6/2002 | Schemmann et al. | 359/181 |
| 2002/0126932 A1 | 9/2002 | Minakata et al. | |
| 2002/0154378 A1 | 10/2002 | Kawanishi et al. | |
| 2005/0008374 A1 * | 1/2005 | Taneda | 398/198 |
| 2005/0110981 A1 | 5/2005 | Hayashi et al. | |
| 2005/0117191 A1 * | 6/2005 | Griffin | 359/245 |
| 2005/0175357 A1 | 8/2005 | Kawanishi et al. | |
| 2007/0019968 A1 * | 1/2007 | Hashimoto et al. | 398/198 |
| 2007/0122161 A1 * | 5/2007 | Charlet et al. | 398/188 |

FOREIGN PATENT DOCUMENTS

| | | |
|---|---|---|
| JP | 63-013017 | 1/1988 |
| JP | 63-13017 | 1/1988 |
| JP | HEI3251815 A | 11/1991 |
| JP | 07-106953 | 4/1995 |
| JP | 08-79174 | 3/1996 |
| JP | 08-111613 | 4/1996 |
| JP | 63-005306 | 1/1998 |
| JP | AS63-13017 | 1/1998 |
| JP | 10-142569 | 5/1998 |
| JP | AH10-133159 | 5/1998 |
| JP | AH11-295674 | 10/1999 |
| JP | 2000-267056 | 9/2000 |
| JP | 2000267056 A | 9/2000 |
| JP | 2000-352699 | 12/2000 |
| JP | 2001075062 A | 3/2001 |
| JP | 2002-033655 | 1/2002 |
| JP | A2002-40381 | 2/2002 |
| JP | A2002-169133 | 6/2002 |
| JP | 2002-268025 | 9/2002 |
| JP | 2004-252386 | 9/2004 |
| JP | 2004302238 A | 10/2004 |
| JP | 2004-318-052 | 11/2004 |
| JP | 2005215196 A | 8/2005 |
| JP | A2005-210537 | 8/2005 |
| WO | WO 03/049333 A1 | 6/2003 |

OTHER PUBLICATIONS

Kawanishi et al., "High Extinction Ratio Optical Modulator Using Active Intensity Trimmers," ECOC 2005 Proceedings, vol. 4, Sep. 2005 pp. 841-842.

Nakatogawa et al., "Optical single sideband modulator for distribution of digital broadcasting signals on millimetre-wave band based on self-heterodyne," Electronics Letters, IEE Stevenage, GB, vol. 40, No. 21, Oct. 14, 2004, pp. 1369-1370.

Kawanishi et al. "Ultra-wide-band signal generation using high-speed optical frequency-shift-keying technique," MWP '04, IEEE International Topical Mtg. on Ogunquit, ME, US, Oct. 4, 2004, Piscataway, NJ, US, pp. 48-51.

Kawanishi et al. "Simultaneous optical modulation of FSK and IM," IEICE Technical Report, Denshi Joho Tsushin Gakkai, Tokyo, JP, vol. 104, No. 268, (OPE2004 123 to, Aug. 20, 2004, p. 41-46—English language abstract.

Extended European Search Report, European Patent Office, Oct. 10, 2008.

Kawanishi et al. "Ultra High Extinction Ratio Intensity Modulation using Optical FSK Modulator", The Institute of Electronics, Information and Communication Engineers, Aug. 19, 2005, pp. 41-44, vol. 105, No. 243, Tokyo, Japan. Abstract, schematics and figures translated.

English Translation: Notice of Reasons for Rejection Patent Application JP2005-242516 Office Action mailed Nov. 24, 2009, Examination Division 1 Optical Control.

Kawanishi et al., "Optical FSK modulator using an integrated lightwave circuit consisting of four optical phase modulators," CPT Digest, Jan. 2004, 139-140, vol. 07, G-3, Tokyo, Japan.

Kawanishi et al., "Resonant-type optical modulator with planar structures," IEICE Technical Report, LQE2001-3 (May 2001), Japan.—English language abstract.

Kawanishi et al. "Ultra High Extinction Ratio Intensity Modulation Using Optical FSK Modulator," IEICE Technical Report, Aug. 19, 2005, 41-44, vol. 105, No. 243 (OCS2005 35-45), Japan.—English language abstract.

Notice of Reasons for Rejection issued by the Japan Patent Office mailed Nov. 24, 2009, for Japanese Patent Application No. 2005-242516.

Office Action issued by the Japanese Patent Office, mailed Nov. 24, 2009, for Japanese Patent Application No. 2005-272624 with English translation.

Sakamoto et al. "Novel Control Method for Externally Modulated Optical Minimum-Shift Keying" The Institute of Electronics, Information and Communication Engineers, Aug. 19, 2005, vol. 105, No. 243 (OCS2005 35-45), pp. 45-50.

Supplementary European Search Report for the corresponding application EP 06 79 8089, Date of completion of the search: Dec. 29, 2008.

International Preliminary Report on Patentability of PCT/JP2006/318478 issued Sep. 9, 2008.

Kawanishi, T. et al., Optical frequency shifter with SSB modulator. Technical Report of IEICE, OCS2002-49, PS2002-33, OFT2002-30 (Aug. 2002).

Sakamoto, T., et al., "Novel modulation scheme for optical continuous-phase frequency-shift keying", OFC 2005, Technical Digest, vol. 5, Mar. 2005, vol. 6.

Shimotsu, S., et al. "LiNb03 Optical Single-Sideband Modulator" OFC 2000, PD-16.

Sakamoto, T., et al., "Novel Control Method for Externally Modulated Optical-Shift Keying," IEICE Technical Report, OCD 2005-43 (Aug. 2005).

Kawanishi, T., et al., "High-speed optical FSK modulator for optical packet labeling,"Journal of Lightwave Technology, vol. 23, No. 1, Jan. 2005, p. 87-94.

\* cited by examiner

US 7,936,996 B2

AUTOMATIC ADJUSTING SYSTEM OF FREQUENCY SHIFT KEYING MODULATOR

CROSS REFERENCE TO RELATED APPLICATION

The present disclosure relates to subject matter contained in the Japanese Patent Application No. 2005-242516 filed on Aug. 24, 2005, the disclosure of which is expressly incorporated herein by reference in its entirety.

BACKGROUND OF THE INVENTION

1. Field of the Invention

The present invention relates to a bias voltage modulation system such as a FSK modulator, etc. (specifically, FSK modulator, QPSK modulator, SSB modulator, etc.) and the like. In particular, the present invention relates to a modulation system and a modulation method which enable to obtain an optimal operating condition automatically by effectively adjusting bias voltage by using an optical modulator having Mach-Zehnder (referred to below as MZ) waveguide and the like.

2. Description of the Related Art

In optical communication, light must be modulated to be converted to signals. As optical modulation, direct modulation and external modulation are known. The direct modulation modulates a driving power of semiconductor laser. And the external modulation modulates light from semiconductor laser by means other than light source. A modulator used in external modulation is generally called an optical modulator. The optical modulator modulates optical intensity, phase, etc. by causing physical changes in the optical modulator based on a signal.

An optical modulator, such as an optical single-side band modulator (optical SSB modulator), and an optical frequency shift keying (optical FSK) modulation method using an optical SSB modulator is described in Tetsuya Kawanishi et al., (Tetsuya Kawanishi and Masami Izutsu, "Optical FSK modulator using an integrated light wave circuit consisting of four optical phase modulator", CPT 2004 G-2, Tokyo, Japan, 14-16 Jan. 2004) etc.

The environment of an optical modulator may change while the optical modulator is being used. The condition of an optical modulator itself also changes while the optical modulator is being used. If the condition of an optical modulator changes as this way, the optimal operational environment may change as well. Especially, with the above changes, the optimal bias voltage level applied to each MZ waveguide will be changed. Therefore, a system for enabling to adjust the bias voltage level automatically is possibly desired.

REFERENCES

Tetsuya Kawanishi et al.

Tetsuya Kawanishi and Masami Izutsu, "Optical FSK modulator using an integrated light wave circuit consisting of four optical phase modulator", CPT 2004 G-2, Tokyo, Japan, 14-16 Jan. 2004

The object of the present invention is to provide an optical modulation system for preferably automatically adjusting operating conditions of the optical modulator such as bias voltage so that the optimal operating condition can be obtained.

SUMMARY OF THE INVENTION

The present invention is based on the following new viewpoint. By providing a bias voltage control part for controlling bias voltage applied to each bias electrode to an optical modulator daringly, an optimal operating condition can be obtained by achieving an optimal bias voltage level while the optical modulator is in operation.

An optical modulation system according to the first aspect of the present invention relates to an optical modulator comprising: a first sub Mach-Zehnder waveguide ($MZ_A$) (2); a second sub Mach-Zehnder waveguide ($MZ_B$) (3); a main Mach-Zehnder waveguide ($MZ_C$) (8) including an input part (4) of an optical signal, a diverging part (5) where the optical light is diverged to the first sub Mach-Zehnder waveguide ($MZ_A$) and the second sub Mach-Zehnder waveguide ($MZ_B$), the first sub Mach-Zehnder waveguide ($MZ_A$), the second sub Mach-Zehnder waveguide ($MZ_B$), a combining part (6) combining the optical signal outputted from the first sub Mach-Zehnder waveguide ($MZ_A$) and the second sub Mach-Zehnder waveguide ($MZ_B$), an output part (7) outputting the optical signal combined in the combining part; a first electrode (electrode A) (9) of the first sub Mach-Zehnder waveguide ($MZ_A$); a second electrode (electrode B) (10) of the second sub Mach-Zehnder waveguide ($MZ_B$); a main Mach-Zehnder electrode (electrode C) (11) of the main Mach-Zehnder waveguide ($MZ_C$); a signal source (12) for applying either one or both of a modulation signal and a bias voltage to the first electrode (9), the second electrode (10) and the main Mach-Zehnder electrode (11); a first bias adjusting means for adjusting bias voltage, the bias voltage being applied to the electrode A and the electrode B, the bias voltage being adjusted so as to maximize an intensity of the optical signal outputted from the main Mach-Zehnder waveguide; a second bias adjusting means for adjusting bias voltage, the bias voltage being applied to the electrode C, the bias voltage being adjusted so that, when the intensity of the optical signal is represented by Max, an intensity of the optical signal is in between 40% to 60%, both inclusive, of the Max, while the bias voltage applied to the electrode A and the electrode B is kept to be the same level as the one obtained in the first bias adjusting means.

As a result of automatic bias adjustment using the optical modulator with the above configuration, the inventors of the present invention found out that the bias voltage level was preferably adjusted during the operation of the optical modulator, and the optical modulator obtained a preferable performance.

Specifically, by using the above optical modulator and automatically performing the bias voltage adjustment method comprising: the first bias adjusting step of adjusting bias voltage applied to each Mach-Zehnder waveguide so as to maximize the intensity of the optical signal outputted from the main Mach-Zehnder waveguide, and; the second bias adjusting step of adjusting bias voltage applied to the main Mach-Zehnder waveguide so that, when the intensity of optical signal observed in the first bias adjusting step is represented by Max, the intensity of the optical signal outputted from the main Mach-Zehnder waveguide is in between 40% to 60%, both inclusive, of the Max, while the bias voltage applied to each sub Mach-Zehnder waveguide is kept to be the same level as the one obtained in the first bias adjusting step, the optical modulator kept demonstrating its preferable performance.

In a preferable embodiment of the optical modulator system according to the first aspect of the present invention, a bias voltage control part (13) as each bias adjustment means, receiving information from the optical detector detecting an optical signal outputted from each MZ waveguide, adjusts bias voltage levels applied to each electrode from the signal source. By adjusting this way, the bias voltage level can be optimally adjusted automatically.

The optical modulator system according to the second aspect of the present invention relates to the above mentioned optical modulator comprising a third bias adjusting means, instead of the second bias adjusting means, for adjusting bias voltage of the main Mach-Zehnder electrode so that an intensity of a dithering signal element is maximized by applying a dithering signal as a bias voltage to the main Mach-Zehnder electrode, while the bias voltage applied to the sub Mach-Zehnder waveguide is kept to be the same level as the one obtained in the first bias adjusting means.

The optical modulator of the present invention is provided with the first bias adjusting means for adjusting bias voltage, the bias voltage being applied to the electrode A and the electrode B, the bias voltage being adjusted so as to maximize an intensity of the optical signal outputted from the main Mach-Zehnder waveguide, and the second bias adjusting means for adjusting bias voltage, the bias voltage being applied to the electrode C, the bias voltage being adjusted so that, when the intensity of the optical signal is represented by Max, an intensity of the optical signal is in between 40% to 60%, both inclusive, of the Max, while the bias voltage applied to the electrode A and the electrode B is kept to be the same level as the one obtained in the first bias adjusting means. Therefore, an appropriate bias point can be obtained, and the optical modulator system which can adjust preferable operational conditions can be provided.

DESCRIPTION OF THE PREFERRED EMBODIMENTS

Figure 1:
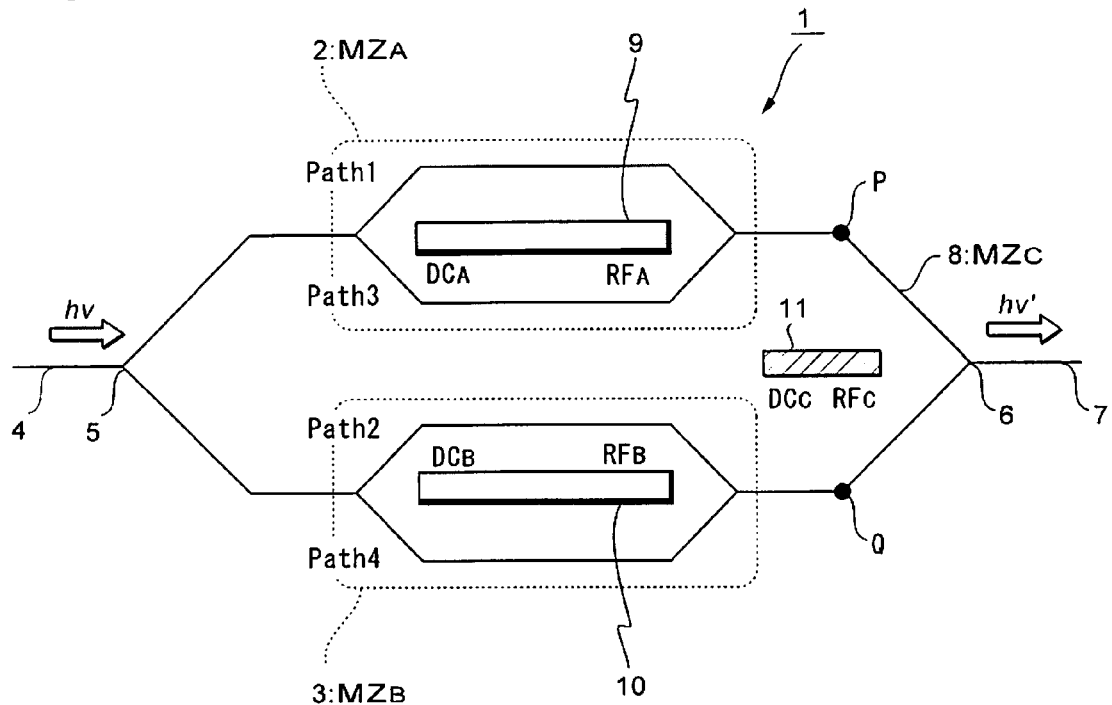
FIG. 1 is a schematic diagram showing a basic arrangement of an optical modulator of the present invention.

1. The First Aspect of the Present Invention 1.1. The Fundamental Features of the Optical Modulator of the Present Invention Hereinafter, the present invention is described referring to drawings. FIG. 1 is a schematic diagram showing a basic arrangement of an optical modulator of the present invention. As shown in FIG. 1, the optical modulator of the present invention is one comprising: a first sub Mach-Zehnder waveguide ($MZ_A$) (2); a second sub Mach-Zehnder waveguide ($MZ_B$) (3); a main Mach-Zehnder waveguide ($MZ_C$) (8) including an input part (4) of an optical signal, a diverging part (5) where the optical light is diverged to the first sub Mach-Zehnder waveguide ($MZ_A$) and the second sub Mach-Zehnder waveguide ($MZ_B$), the first sub Mach-Zehnder waveguide ($MZ_A$), the second sub Mach-Zehnder waveguide ($MZ_B$), a combining part (6) combining the optical signal outputted from the first sub Mach-Zehnder waveguide ($MZ_A$) and the second sub Mach-Zehnder waveguide ($MZ_B$), an output part (7) outputting the optical signal combined in the combining part; a first electrode (electrode A) (9) of the first sub Mach-Zehnder waveguide ($MZ_A$); a second electrode (electrode B) (10) of the second sub Mach-Zehnder waveguide ($MZ_B$); a main Mach-Zehnder electrode (electrode C) (11) of the main Mach-Zehnder waveguide ($MZ_C$); a signal source (12) for applying either one or both of a modulation signal and a bias voltage to the first electrode (9), the second electrode (10) and the main Mach-Zehnder electrode (11); a first bias adjusting means for adjusting bias voltage, the bias voltage being applied to the electrode A and the electrode B, the bias voltage being adjusted so as to maximize an intensity of the optical signal outputted from the main Mach-Zehnder waveguide; a second bias adjusting means for adjusting bias voltage, the bias voltage being applied to the electrode C, the bias voltage being adjusted so that, when the intensity of the optical signal is represented by Max, an intensity of the optical signal is in between 40% to 60%, both inclusive, of the Max, while the bias voltage applied to the electrode A and the electrode B is kept to be the same level as the one obtained in the first bias adjusting means.

In the preferable embodiment of the optical modulation system according to the first aspect of the present invention, the optical modulation system adjusts the bias voltage level by the bias voltage control part (13) as each bias adjustment means, and with the bias voltage level, the optical modulation system performs optical modulation, generating FSK signals, QPSK signals, and SSB signals each of which have high extinction ratio. Also, continuous FSK modulation, for example, causes changes in temperature, which in turn brings about changes in the optimal bias voltage level. In this case, the optical modulator of the present invention automatically derives the optimal bias voltage level, and performs optical modulation based on the newly derived optimal bias voltage level, realizing a modulation with high extinction ratio and the like.

It is to be noted that the optical modulator of the present invention is provided with the MZ waveguides, each of whose output part having X-branching form for example, or each of which being provided with Y-branching somewhere between output part and combining part (6) for example. This configuration enables the optical modulator to measure the output signal from each MZ waveguide. Specifically, one end of the branching is connected to the optical modulator and the like enabling to measure optical intensity. An output signal from the main MZ waveguide can also be measured in the same way. And the information on optical intensity and the like measured by each optical detector is, for example, converted into electric signal and transmitted to the voltage control part (13) as each bias adjustment means.

1.2. Sub MZ Waveguide

Hereinafter, each component of the optical modulator of the present invention is described. Each Mach-Zehnder waveguide, for example, is provided with a waveguide of nearly hexagonal shape (which composes two arms of the MZ), and is provided with two parallel aligned phase modulators. A phase modulator for example can be realized by an electrode which is parallel aligned with waveguides. An intensity modulator for example can be realized by a MZ waveguide and an electrode applying electric field to the both arms of the MZ waveguide.

A Mach-Zehuder waveguide or an electrode is generally provided on a substrate. The material of the substrate and each waveguide is not specifically limited if light can propagate therethrough. For example, a lithium niobate waveguide with a Ti diffusion may be formed on an LN substrate, and a silicon dioxide ($SiO_2$) waveguide may be formed on a silicon (Si) substrate. Also, an optical semiconductor waveguide such as an InGaAsP waveguide (a GaAlAs waveguide) formed on an indium phosphide substrate (a GaAs substrate) may be used. The substrate is preferably formed of lithium niobate ($LiNbO_3$: LN) and cut out in a direction orthogonal to the X-axis (X-cut), and light is propagated in a Z-axis direction (Z-axis propagation). This is because a low-power-consumption drive and a superior response speed can be achieved due to dynamic electrooptic effect. An optical waveguide is formed in the surface portion of a substrate having an X-cut plane (YZ plane), and guided light propagates along the Z-axis (the optic axis). A lithium niobate substrate except the X-cut may be used. As a substrate, it is possible to use a material of a one-axis crystal having a crystal system such as a trigonal system and a hexagonal system and having electro optical effect or a material in which a point group of a crystal is $C_{3v}$, $C_3$, $D_3$, $C_{3h}$. These materials have a refractive index adjusting function in which a change in the refractive index due to the application of an electric field has a different sign depending on a mode of a propagation light. As a specific example, lithium tantalite oxide ($LiTO_3$: LT), $\beta$-$BaB_2O_4$ (abbr. BBO), $LiIO_3$ and the like can be used other than lithium niobate.

The dimension of the substrate is not particularly limited if it is large enough to be able to form a predefined waveguide. The width, length, and the depth of each waveguide is also not particularly limited if the module of the present invention is able to fulfill its function. The width of each waveguide can be, for example, around 1 µm to 20 µm, preferably about 5 µm to 10 µm. The depth (the thickness) of waveguide can be 10 nm to 1 µm, preferably 50 nm to 200 nm.

The diverging part (5) of the main MZ waveguide ($MZ_C$) is a part where optical signals diverge into the first sub MZ waveguide ($MZ_A$) and the second sub MZ waveguide ($MZ_B$). The example of the diverging part (5) is a Y-branching. The combining part (6) is a part where optical signals outputted from the first sub MZ waveguide ($MZ_A$) and the second sub MZ waveguide ($MZ_B$) are combined. The example of the combining part (6) is a Y-branching formed combining part. The above Y-branching formed parts may be symmetry or asymmetry. As the diverging part (5) or the combining part (6), a directional coupler can be used.

The preferable embodiment of the above described optical modulator is the one that is provided with an asymmetric directional coupler at the diverging part (5) of the main MZ waveguide ($MZ_C$) (8), and controlled so that the intensity of the optical signal diverged to the first sub MZ waveguide ($MZ_A$) by the asymmetric directional coupler is larger than that of the optical signal diverged to the second sub MZ waveguide ($MZ_B$).

1.3 Electrode on Sub MZ Waveguide

The first sub MZ waveguide ($MZ_A$) (electrode A) and the second sub MZ waveguide ($MZ_B$) (electrode B) are provided on each sub MZ waveguide. The electrode A serves as each or both of a $DC_A$ electrode and an $RF_A$ electrode. The electrode B serves as each or both of a $DC_B$ electrode and an $RF_B$ electrode.

The first bias adjustment electrode ($DC_A$ electrode) is an electrode for controlling bias voltage between the two arms (path 1 and Path 3) composing the $MZ_A$ to control a phase of light propagating between the two arms of the $MZ_A$. On the other hand, the second bias adjustment electrode ($DC_B$ electrode) is an electrode for controlling bias voltage between the two arms (path 2 and path 4) composing the $MZ_B$ to control a phase of light propagating between the two arms of the $MZ_B$. The $DC_A$ electrode and the $DC_B$ electrode are preferably direct current electrodes or low frequency electrodes in general. It is to be noted that "low frequency" of the low frequency electrode means frequency of, for example, 0 Hz to 500 MHz. A phase modulator for adjusting a phase of an electric signal is preferably provided at the output of the signal source of this low frequency signal in order to be able to control a phase of an output signal.

The first modulation electrode ($RF_A$ electrode) is an electrode for inputting a radio frequency (RF) signal to the two arms comprising the $MZ_A$. On the other hand, the second modulation electrode ($RF_B$ electrode) is an electrode for inputting radio frequency ($RF_A$ signal and $RF_B$ signal) signals to the two arms comprising the $MZ_B$. A traveling-wave-type electrode or a resonant-type electrode can be mentioned as the $RF_A$ electrode and the $RF_B$ electrode, and the resonant-type electrode is preferable.

As explained above, two other electrodes may serve as a $DC_A$ electrode and an $RF_A$ electrode separately, on the other hand, one electrode may act as those electrodes alone. In the latter case, a bias voltage and a radio frequency signal is applied to one electrode.

The $RF_A$ electrode and the $RF_B$ electrode are preferably connected to a high frequency signal source. The high frequency signal source is a device for controlling a signal transmitted to the $RF_A$ electrode and the $RF_B$ electrode. As the high frequency signal source, a known high frequency signal source can be adopted. As frequencies ($f_m$) of the high frequency signal inputted to the $RF_A$ electrode and the $RF_B$ electrode, e.g. 1 GHz to 100 GHz can be mentioned. As an output of a high frequency signal source, a sinusoidal wave having a fixed frequency can be mentioned. A phase modulator is preferably provided at an output of this high frequency signal source in order to be able to control a phase of an output signal.

The $RF_A$ electrode and the $RF_B$ electrode are composed of e.g. gold, platinum or the like. As the width of the $RF_A$ electrode and the $RF_B$ electrode, 1 µm to 10 µm can be mentioned, and 5 µm can be specifically mentioned. As the length of the $RF_A$ electrode and the $RF_B$ electrode, 0.1 times to 0.9 times the wavelength ($f_m$) of the modulation signal can be mentioned including 0.18 to 0.22 times or 0.67 to 0.70 times. And more preferably, it is shorter than the resonant point of the modulation signal by 20 to 25%. This is because with such a length, the synthesized impedance with a stub electrode remains in an appropriate region. As a more specific length of the $RF_A$ electrode and the $RF_B$ electrode, 3250 µm can be mentioned. Hereinafter, a resonant-type electrode and a traveling-wave-type electrode are described.

A resonant-type optical electrode (resonant-type optical modulator) is an electrode for performing a modulation by using resonance of a modulation signal. A known resonant-type electrode such as those described in the Japanese Patent Application Laid-Open 2002-268025, and [Tetsuya Kawanishi, Satoshi Oikawa, Masayuki Izutsu, "Planar Structure Resonant-type Optical Modulator", TECHNICAL REPORT OF IEICE, LQE2001-3 (2001-05)] can be adopted as a resonant-type electrode.

A traveling-wave-type electrode (traveling-wave-type optical modulator) is an electrode (modulator) for modulating light while guiding waves so that a lightwave and an electric signal are guided in the same direction (e.g. Hiroshi Nishihara, Masamitsu Haruna, Toshiaki Suhara, "Optical Integrated Circuit" (revised and updated edition), Ohmsha, pp. 119-120). A known traveling-wave-type electrode such as those described in Japan Patent Application Laid-Open Nos. 11-295674, 2002-169133, 2002-40381, 2000-267056, 2000471159, and 10-133159, for example, can be adopted as a traveling-wave-type electrode.

As a preferable traveling-wave-type electrode, a so-called symmetrical-type earth electrode arrangement (one provided with at least a pair of earth electrodes on both sides of a traveling-wave-type signal electrode) is adopted. Thus, by symmetrically arranging the earth electrodes on both sides of the signal electrode, a high frequency wave outputted from the signal electrode is made easy to be applied to the earth electrodes arranged on the left and right side of the signal electrode, thereby suppressing an emission of a high frequency wave to the side of the substrate.

The RF electrode may act as both of the electrodes for the RF signal and the DC signal. Namely, either one of or both of the $RF_A$ electrode and the $RF_B$ electrode are connected to a feeder circuit (bias circuit) for supplying the DC signal and the RF signal mixed. Since the optical SSB modulator of this embodiment has the RF electrode connected to the feeder circuit (bias circuit), an RF signal (ratio frequency signal) and a DC signal (direct current signal: signal related to a bias voltage) can be inputted to the RF electrode.

The main MZ electrode (electrode C) (11) is an electrode for controlling the phase difference between an output from the first sub MZ waveguide ($MZ_A$) and an output from the second sub MZ waveguide ($MZ_B$) by applying a modulation signal to the main MZ waveguide ($MZ_C$). The main MZ electrode (electrode C) (11) is also an electrode for controlling the phase of an optical signal outputted by applying bias voltage to the main MZ waveguide ($MZ_C$). As the electrode C, the electrode for the sub MZ explained above can be used as needed. Since a radio frequency signal as a modulation signal for example is applied to the electrode C, a traveling-wave-type electrode corresponding to the radio frequency signal is preferable for the electrode C. Since the phase difference of optical signals of both arms is controlled by the electrode C, a signal desired to be cancelled, e.g. an USB signal or an LSB signal, can be suppressed by reversing the phase of the signal. By performing this phase control at high speed, frequency shift keying can be realized. Also, the phase of the USB signal an the LSB signal can be adjusted by applying bias voltage to the main MZ electrode (11) in order to control the phase of an optical signal outputted from the main MZ waveguide ($MZ_C$) (8).

The main MZ electrode (electrode C) (11) is electrically connected to the signal source (12). And, the signal source (12) is used to apply either one or both of a modulation signal and a bias voltage to the main MZ electrode (11), the modulation signal controlling the phase difference between an output signal from the first sub MZ waveguide ($MZ_A$) and an output signal from the second sub MZ waveguide ($MZ_B$), the bias voltage controlling a phase of an optical signal outputted from the main MZ waveguide ($MZ_C$) (8).

In case the optical modulator acts as an FSK modulator, the phase difference of an optical signal from each sub MZ waveguide is controlled at high speed by the modulation signal ($RF_C$ voltage), then a USB signal and an LSB signal is switched over to be outputted as an FSK signal. As this modulation signal, the same one explained above can be used. Also, the phases of the USB signal and the LSB signal are controlled by bias voltage ($DC_C$ voltage) applied to the main MZ electrode (11) especially between the combining part (6) and the output part (7) of the main MZ waveguide ($MZ_C$) (8). As this bias voltage, the same one explained above can be used.

1.4. Signal Source

As explained above, in the conventional FSK modulator, two kinds of signals ($DC_A$ voltage and $DC_B$ voltage) as bias voltages are generally applied to the electrode A and the electrode B respectively from one signal source, and three kinds of signals ($RF_A$ voltage, $RF_B$ voltage and $RF_C$ voltage) are applied to the electrode A, the electrode B and the electrode C respectively from the other high-frequency power source. Also, in the conventional SSB modulator, three kinds of signals ($DC_A$ voltage, $DC_B$ voltage and $DC_C$ voltage) as bias voltages are generally applied to the electrode A, the electrode B and the electrode C respectively from one signal source, and two kinds of signals ($RF_A$ voltage and $RF_B$ voltage) are applied to the electrode A and the electrode B from the other high-frequency power source.

On the other hand, in the optical modulator of the present invention, three kinds of signals ($DC_A$ voltage, $DC_B$ voltage and $DC_C$ voltage) as bias voltages are preferably applied to the electrode A, the electrode B and the electrode C respectively from one signal source in general, and three kinds of signals ($RF_A$ voltage, $RF_B$ voltage and $RF_C$ voltage) are applied to the electrode A, the electrode B and the electrode C respectively from the other high-frequency power source. As this way, in the optical modulator of the present invention, the signal wiring from the power source has more complicated circuit structure than that of the conventional one, but the optical modulator can adjust, for example, the phase of the FSK signal. It is to be noted that only one signal source is designated as one for applying each bias voltage to the optical modulator, and phase modulation or time control is preferably performed by a phase modulator or a delay circuit as needed. Also, only one signal source is designated as one for applying modulation signal and the like to the optical modulator, and phase modulation or time control is preferably performed by a phase modulator or a delay circuit as needed. And the phase, the intensity and the timing of the signal transmitted from the signal sources to each electrode is preferably controlled by a control part such as a computer connected to the signal source.

Figure 2:
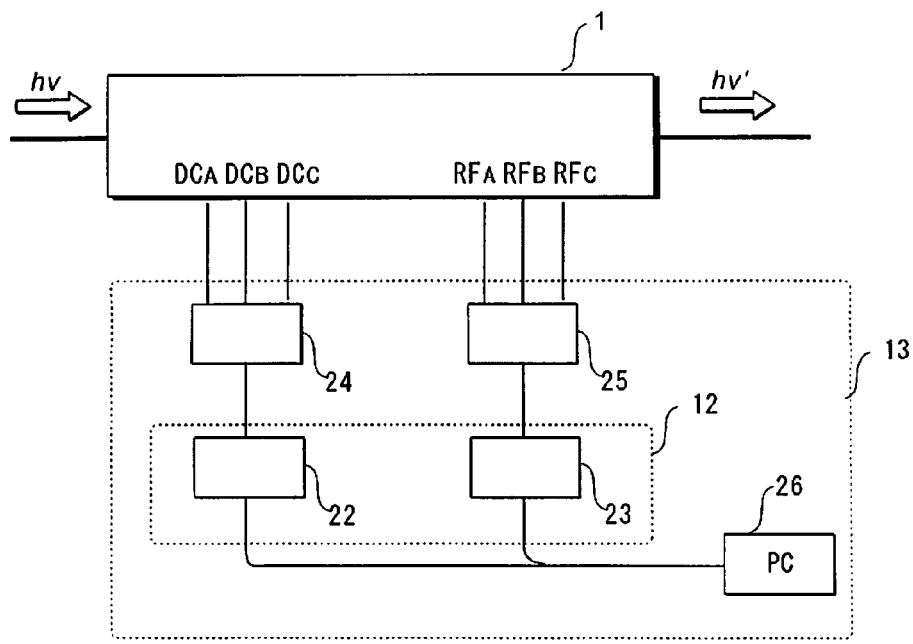
FIG. 2 is a conceptual diagram showing a signal source according to a certain embodiment of the present invention.

FIG. 2 is a conceptual diagram showing a signal source according to a certain embodiment of the present invention. As shown in FIG. 2, this embodiment of the signal source (21) is provided with a bias signal source (low frequency signal source) (22) and a high frequency signal source (23), the bias signal source applying bias voltage (low frequency signal) to two sub MZ waveguides and a main MZ waveguide, the high frequency signal source applying a radio frequency signal to two sub MZ waveguides and a main MZ waveguide. These signal sources are, for example, connected to adjustment mechanisms (24,25) for adjusting the phase, the intensity, the frequency and the apply timing of the electric signal, and the phase and the like of the signal are adjusted as needed. The amount of the adjustment may be fixed, or may be controlled by a control mechanism such as a computer (26) connected to each adjustment mechanism.

The bias signal source (low frequency signal source) (22) generates a low frequency signal. The signal is adjusted in one or more of its phase, intensity, frequency or apply timing by the adjustment mechanism (24), and then three kinds of signals ($DC_A$ voltage, $DC_B$ voltage and $DC_C$ voltage) are applied to the optical modulator (1). As explained above, "low frequency" of the low frequency signal means frequency of, for example, 0 Hz to 500 MHz.

The high frequency signal source (23) generates a high frequency signal. The signal is adjusted in one or more of its phase, intensity, frequency or apply timing by the adjustment mechanism (25), and then three kinds of signals ($RF_A$ voltage, $RF_B$ voltage and $RF_C$ voltage) are applied to the optical modulator (1). As explained above, as high frequency ($f_m$) of the high frequency signal, frequency of, for example, 1 GHz to 100 GHz can be mentioned. As an output of the high frequency electric signal source, a sinusoidal wave with a fixed frequency can be mentioned.

1.5 Bias Voltage Control Part

The bias voltage control part (13) is realized by a computer including a computer readable recording media which act as the first bias modulation means and the second bias modulation means, wherein the first bias modulation means outputs a control signal for adjusting bias voltage applied to each sub MZ waveguide so that the intensity of the optical signal outputted from the main MZ waveguide is maximized, and the second bias adjusting means outputs a control signal for adjusting bias voltage applied to the main MZ electrode so that, when the intensity of the optical signal is represented by Max, the intensity of the optical signal outputted from the main MZ waveguide is in between 40% to 60%, both inclusive, of the Max, while the bias voltage applied to the sub MZ waveguide is kept to be the same level as the one obtained in the first bias adjusting means.

The above each means is implemented in a computer and the like which comprises an input device, a memory part, a computing part, a control part and an output part, wherein the input device inputs measured value from the measurement system, the memory part stores the measured value inputted from the input device, the computing part compares the measured value stored in the memory part, the control part, following the input information from the input device, reads a control program stored in the main memory, retrieves each measured value stored in the memory part, and performs a certain control, and an output part outputs a direction on the bias voltage to the signal source based on the computing result from the computing part.

Instead of the second bias adjusting means, the bias voltage control part (13) may contain a third bias adjusting means, which adjusts the bias voltage of the main MZ electrode so that an output of a dithering signal element is maximized by applying a dithering signal as a bias voltage to the main Mach-Zehnder electrode, while the bias voltage applied to the sub Mach-Zehnder waveguide is kept to be the same level as the one obtained in the first bias adjusting means. The dithering signal may be generated by the second bias modulation means with a dithering generation circuit which applies the dithering processing to the staircase wave signal.

For example, by applying m times of dithering to a staircase wave of n steps, the number of steps of the staircase wave becomes (n times m), enhancing the comparative accuracy of the staircase wave signal without increasing the number of steps of the frequency. As the dithering generation circuit, for example, the one composed of a feedback frequency divider (abbr. as DIV) and a modulation circuit can be mentioned.

The dithering generation circuit, for example, operates as follows. An output frequency of the voltage controlled oscillator (VCO) is provided to an output terminal and a feedback frequency divider. On the other hand, the modulation circuit receives reference input signal R, generates frequency which applies a certain cycle of fluctuation to an output frequency, and provides the output frequency to the feedback frequency divider. The feedback frequency divider changes the ratio of frequency dividing in the range of about 1% by an output from the modulation circuit in certain cycle. And then, an output of the feedback frequency divider is provided to a phase comparison circuit. By these ways, the dithering signal is generated.

Also, the bias voltage control part (13) may further includes the fourth bias adjusting mechanism for outputting a control signal, the control signal adjusting bias voltage applied to each sub MZ waveguide so that the intensity of the optical signal outputted from each sub MZ waveguide is maximized, while the bias voltage applied to the main Mach-Zehnder electrode is kept to be the same level as the one obtained by the second or the third bias adjusting means.

The optical modulator of the present invention may be the one for controlling the phase of the output signal by adjusting bias voltage applied to the main MZ electrode. In this case, in addition to the ordinary operation of the FSK modulation, the bias voltage is applied to the main MZ electrode, enabling to obtain a phase adjusted FSK modulation signal.

1.6 Optical Modulator

As the optical modulator of the present invention, a know optical modulator can be mentioned. As the optical modulator of the present invention, an FSK modulator, a PSK modulator, a QPSK modulator, an SSB modulator, a DSB-SC modulator and an MSK modulator can be mentioned, more preferably however an FSK modulator, a QPSK modulator or an SSB modulator can be mentioned.

FSK is the abbreviation of Frequency Shift Keying. The FSK is a modulation method based on the frequency difference information. When the carrier frequency is represented by ($f_0$) and the frequency of a modulation signal is represented by ($f_m$), the FSK modulator is one that outputs the USB signal ($f_0+f_m$) and the LSB signal ($f_0-f_m$) as information.

PSK is the abbreviation of Phase Shift Keying. The PSK is a modulation method based on the phase difference information. Since the PSK modulator uses the phase difference information, phase 0 and phase $\pi$, for example, is used as information.

QPSK is a modulation method for combining two modulation waves with different phases. In QPSK modulation, for example, four different phases such as 0, $\pi/2$, $\pi$ and $3\pi/2$ are used. A specific embodiment of the QPSK modulator is for example described in [R. A. Griggin, et. al., "10 Gb/s Optical Difference Quadrature Phase Shift Key (DQPSK) Transmissing using GaAs/AlGaAs Integration" OFC 2002 Postdeadline Paper FD6-1].

SSB modulation means Optical Single Side-Band. And, a SSB modulator outputs an optical signal with its frequency shifted.

DSB-SC modulator means Optical Double Sideband Suppressed Carrier Modulator. The Optical Double Sideband Suppressed Carrier Modulator ideally outputs two side-bands ($f_0 \pm f_m$), and suppresses carrier element. In case of using the optical modulator of the present invention as a DSB-SC modulator, an $RF_A$ signal and an $RF_B$ signal are applied to the electrode C.

MSK is the abbreviation of Minimum Shift Keying.

2. Bias Adjusting Method of the Present Invention 2.1. First Bias Adjusting Step The first bias adjusting step is one for adjusting bias voltage of each MZ waveguide so as to maximize an intensity of an optical signal outputted from the main MZ waveguide. In this step, the bias voltages of the electrode C and the two sub MZ electrode is adjusted so as to increase the output from the main MZ waveguide (preferably increased as much as possible, more preferably maximized). Since the main MZ waveguide is connected to a measurement system not shown in figures, the bias voltage applied to each MZ electrode may be adjusted by observing output levels of the measurement system. It is to be noted that "the maximum output" is not in a strict sense of the word, but is the maximum level when each bias voltage is changed in, for example, 5-100V. It may also be the maximum level of the samples performed in about 1-10V interval.

The measurement system may be connected to a power supply system providing each bias voltage via a control device, and each bias voltage may be controlled so that an optical intensity measured by the measurement system is increased. The control device is provided with an input part, an output part, a memory part (including memory and main memory), a computing part, and a control part, the input part inputting information, the output part outputting information, the memory part storing information, and the computing part such as CPU performing arithmetic operations or controls. Information on optical intensity measured by the measurement system is inputted to the control device by the input part, and stored in the memory. The CPU of the control device, based on a direction from a controlling program of the main memory, retrieves the information on optical intensity from the memory. Also, the CPU of the control device, based on a direction from a controlling program of the main memory, outputs a signal changing bias voltages applied to any one of or two or more of electrodes from the output part. This process changes the intensity level of output light. The control device, retrieving the information and comparing it to the former optical intensity, outputs a direction of changing bias voltages so as to increase the optical intensity from the output part. A power source which received this output signal, based on the direction, changes voltage levels applied to each electrode, thereby increasing the optical output.

2.2 Second Bias Adjusting Step

The second bias adjusting step is one for adjusting bias voltage applied to the main Mach-Zehnder electrode, the bias voltage being adjusted so that, when the intensity of the optical signal observed in the first bias adjusting step is represented by Max, an intensity of the optical signal outputted from the main Mach-Zehnder waveguide is in between 40% to 60%, both inclusive, (preferably half) of the Max, while the bias voltage applied to each sub Mach-Zehnder waveguide is kept to be the same level as the one obtained in the first bias adjusting step.

The voltage control part outputs a direction to maintain bias voltage applied to each sub MZ waveguide at the same level as the one obtained in the first bias adjusting step. Following the direction, the signal source maintains the bias voltage applied to each sub MZ waveguide at a fixed level. The voltage control part, on the other hand, observes an intensity of the optical signal outputted from the main MZ waveguide, compares it to the Max, and outputs a direction to adjust the bias voltage applied to the main MZ electrode. Having received the direction, the signal source adjusts the bias voltage applied to the main MZ waveguide.

Specifically, information on optical intensity measured by the measurement system is inputted to the control device by the input part, and stored in the memory. The CPU of the control device, based on a direction from a controlling program of the main memory, retrieves information on optical intensity from the memory. Also, the CPU of the control device, based on a direction from the controlling program of the main memory, outputs a signal changing the bias voltage applied to the main MZ electrode from the output part. By ding this, the intensity level of output light changes. The control device, retrieving the information and comparing it to the former optical intensity, outputs a direction of changing the bias voltage so as to increase the optical intensity from the output part. The bias signal source which received this output signal, based on the direction, changes voltage levels applied to the main MZ electrode, thereby reducing the intensity of the optical signal from the main MZ waveguide. When the intensity of the output signal from the main MZ waveguide reaches a predetermined level such as one in between 40% to 60%, both inclusive, (preferably half) of the Max, this step is terminated, and the next step will be performed.

2.3. Third Bias Adjusting Step

The third bias adjusting step is an optional step for adjusting bias voltage applied to each sub Mach-Zehnder waveguide, the bias voltage being adjusted so as to maximize the intensity of the optical signal outputted from each sub MZ waveguide, while the bias voltage applied to the main Mach-Zehnder electrode is kept to be the same level as the one obtained in the second bias adjusting step.

The voltage control part outputs a direction to maintain the bias voltage applied to the main MZ electrode at the same level as the one obtained in the second bias adjusting step. Following the direction, the bias signal source maintains the bias voltage applied to the main MZ electrode at the same level as the one obtained in the second bias adjusting step. The voltage control part, on the other hand, observes an intensity of the optical signal outputted from each sub MZ waveguide, outputs a direction to adjust the bias voltage applied to each sub MZ electrode so as to maximize the each observed level. Having received the direction, the signal source adjusts the bias voltage applied to each sub MZ waveguide.

Specifically, information on optical intensity measured by the measurement system is inputted to the control device by the input part, and stored in the memory. The CPU of the control device, based on a direction from a controlling program of the main memory, retrieves the information on optical intensity from the memory. Also, the CPU of the control device, based on a direction from the controlling program of the main memory, outputs a signal changing the bias voltage applied to each sub MZ electrode from the output part. By ding this, the intensity level of output light changes. The control device, retrieving the information and comparing it to the optical intensity so far stored, outputs a direction of changing the bias voltage so as to maximize the optical intensity from the output part. The bias signal source which received this output signal, based on the direction, changes voltage levels applied to each sub MZ electrode, thereby changing the intensity of the optical signal from each sub MZ waveguide. When the intensity of the output signal from the both of the sub MZ waveguide reaches the maximum level, this step is terminated, thereby enabling to obtain an appropriate bias voltage.

2.4. Another Embodiment of Second Bias Adjusting Step

Another embodiment of the present invention is as follows. Instead of the second bias adjusting step, applying a dithering signal (minute vibration signal) as a bias voltage to the main MZ electrode and adjusting the bias voltage of the main Mach-Zehnder electrode so as to maximize an output of a dithering signal element, while the bias voltage applied to the sub Mach-Zehnder waveguide is kept to be the same level as the one obtained in the first bias adjusting step.

3. Manufacturing Method of Optical Modulator of Present Invention

As a forming method of an optical waveguide, a know forming method of the internal diffusion method such as the titanium diffusion method or a proton exchange method and the like can be used. In other words, the optical modulator of the present invention, for example, can be manufactured by the following method. Firstly, an optical waveguide is formed by patterning titanium on the surface of a wafer of lithium niobate by photolithography method, and spreading titanium by thermal diffusion method. This is subject to the following conditions. The thickness of titanium is 100 to 2000 angstrom, diffusion temperature is 500 to 2000° C., and diffusion time is 10 to 40 hours. An insulating buffer layer of silicon dioxide (thickness of 0.5 to 2 μm) is formed on a principle surface of the substrate. Secondly, an electrode with metal plating with thickness of 15 to 30 μm is formed on the buffer layer. And lastly, the wafer is cut off. By these processes, an optical modulator formed with titanium-diffused waveguide is manufactured.

Also, an electrode is manufactured in the same way as the above process. For example, in the same way as a formation of an optical waveguide, by using photolithography technique, an electrode can be formed on both sides of a plurality of waveguides which are formed in the same breadth, the electrode being formed so that the interelectrode gap is about 1 μm to 50 μm.

In case of manufacturing an electrode using silicon substrate, the manufacturing process, for example, is as follows. A lower cladding layer is disposed on a silicon (Si) substrate by the flame hydrolysis deposition method, the lower cladding layer being composed mostly of silicon dioxide ($SiO_2$). And then a core layer is deposed, the core layer being composed mostly of silicon dioxide ($SiO_2$) to which germanium dioxide ($GeO_2$) is added as a dopant. Subsequently, vitrification is performed in an electric furnace. And then, an optical waveguide is formed by etching and an upper cladding layer is disposed, the upper cladding layer being composed mostly of silicon dioxide ($SiO_2$). And then, a thin-film heater thermooptic intensity modulator and a thin-film heater thermooptic phase modulator are formed on the upper cladding layer.

The phase modulator can easily be manufactured, for example, by a waveguide and an electrode capable of applying an electric field to the waveguide. The intensity modulator can easily be manufactured, for example, by a MZ waveguide and an electrode, the electrode being provided on each arm of the MZ waveguide and capable of applying an electric field to the waveguide composing each arm.

4. Second Embodiment

Figure 3:
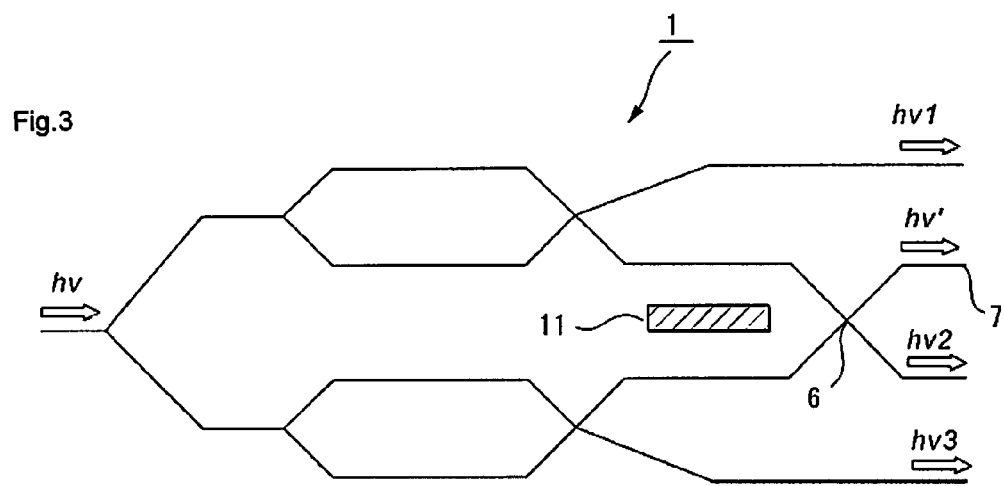
FIG. 3 is a schematic block diagram showing an optical modulator with an asymmetric branching according to a preferable embodiment of the present invention.
Figure 4:
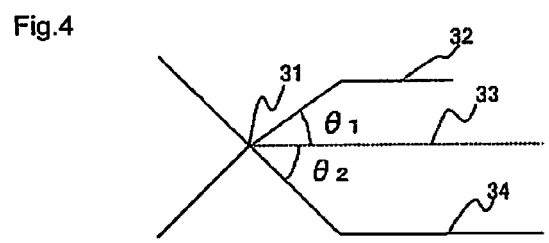
FIG. 4 is a diagram showing an example of an asymmetric X-branching.

FIG. 3 is a schematic block diagram showing an optical modulator with an asymmetric branching according to a preferable embodiment of the present invention. As shown in FIG. 3, in this embodiment of the optical modulator, an output part of at least one sub MZ waveguide has an asymmetric X-branching. By having an asymmetry X-branching, a noise resistant control can be performed. FIG. 4 is a diagram showing an example of an asymmetric X-branching. In FIG. 4, 31 denotes a branching point of the MZ waveguide, 32 denotes a light pass where light for intensity measurement or unnecessary light is propagated, 33 denotes a midline of the MZ waveguide, 34 denotes a light path where an output light of the MZ waveguide is propagated. The light pass (32) is preferably connected to the photodetector so that an amount of light propagating through the light pass is measured. As an angle ($\theta_1$) formed by the light path (32) and the midline (33), 0.001° to 10° is mentioned, where 0.01° to 2.0° is preferable, and 0.1° to 0.3° is more preferable. Also, as an angle ($\theta_2$) formed by the light path (34) and the midline (33), 0.001° to 10° is mentioned, where 0.01° to 2.0° is preferable, and 0.1° to 0.3° is more preferable, and 0.2° to 0.25° is specifically preferable. As a relationship between $\theta_1$ and $\theta_2$, for example, $\theta_1 > \theta_2$, can be mentioned.

5. Third Embodiment

Figure 5:
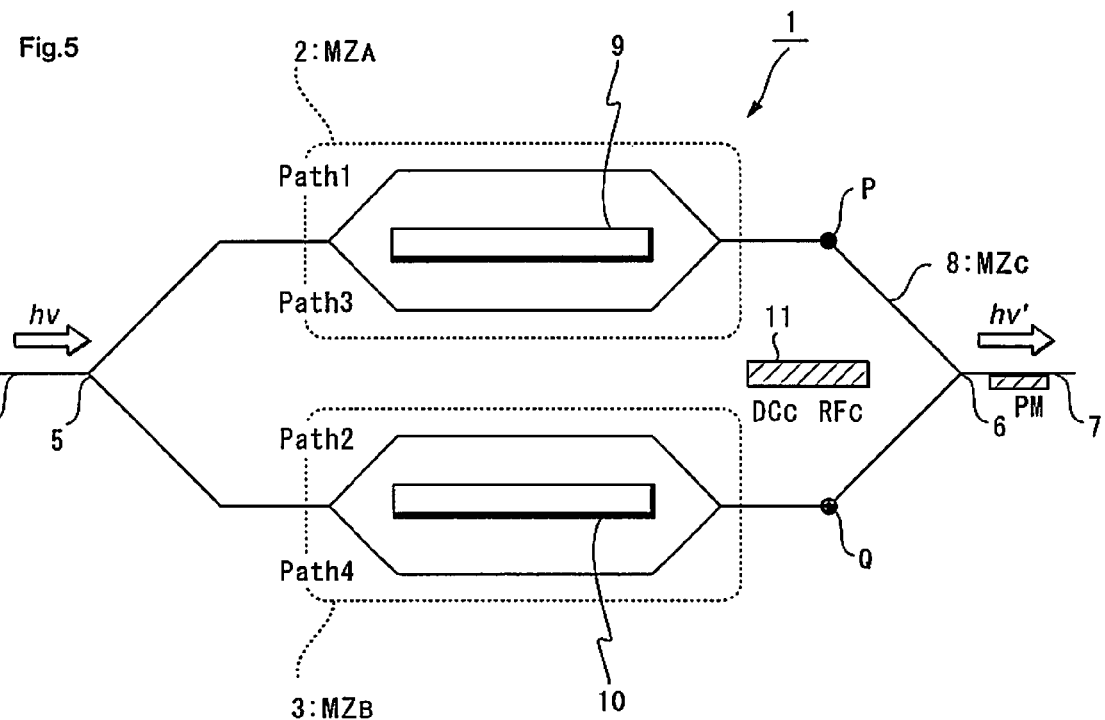
FIG. 5 is a schematic block diagram showing an optical modulator with a phase modulation mechanism according to a preferable embodiment of the present invention.

FIG. 5 is a schematic block diagram showing an optical modulator with a phase modulation mechanism according to a preferable embodiment of the present invention. As shown in FIG. 5, the optical modulator according to this embodiment has basically all the components of the optical modulator according to the first embodiment, and by further including a mechanism capable of adjusting the phase of the optical signal between the combining part (6) of the main MZ waveguide and the output part (7), the optical modulator is capable of outputting a phase controlled USB signal or a phase controlled LSB signal. Therefore, an FSK signal is enabled to have phase modulation information. This enables an FSK-PSK modulation, and an optical signal is enabled to have not only frequency shift information but phase modulation information. As PSK modulation, modulation of phase shifts of 0°, 90°, 180° and 270° can be mentioned, but any phase shift which can be decoded by a decoder can be available.

As a mechanism capable of phase modulation of an optical signal, a phase modulator (PM) can be mentioned. Since the phase modulator is desirable to be synchronized with an FSK signal, it is preferable to use a signal which is outputted from the signal source of the above optical phase modulator as a modulation signal of the phase modulator. In this case, a bias voltage or a high frequency signal is applied to the phase modulation mechanism from the signal source, but the high frequency signal is preferable to be applied. By applying the high frequency signal to the phase modulation mechanism, the optical phase of the FSK signal is shifted, and a signal is enabled to have phase shift information. It is to be noted that the phase modulation mechanism can be realized by applying a signal for controlling the optical phase of the FSK signal to the main MZ electrode, not by providing a phase modulator.

A modulation signal which controls the phase difference between an output signal from the first sub MZ waveguide ($MZ_A$) and an output signal from the second sub MZ waveguide ($MZ_B$) is applied to the main MZ electrode (11). And a bias voltage is applied to the main MZ electrode (11) to control the phase of the optical signal outputted from the main MZ waveguide ($MZ_C$) (8).

6. Operation Example of Optical Modulator

Hereinafter, an operation example of the optical modulator is described. For example, sinusoidal RF signals of 90° phase difference are applied to parallel aligned four optical modulators (comprising the $RF_A$ electrode and $RF_B$ electrode) of the sub MZ waveguide. And with respect to the optical signal, bias voltages are applied to the $DC_A$ electrode and the $DC_B$ electrode so that phase differences of the optical signals are respectively 90°. These phase differences of the electric signals and the optical signals are adjusted as needed, but are basically adjusted to be an integral multiple of 90°.

Figure 6:
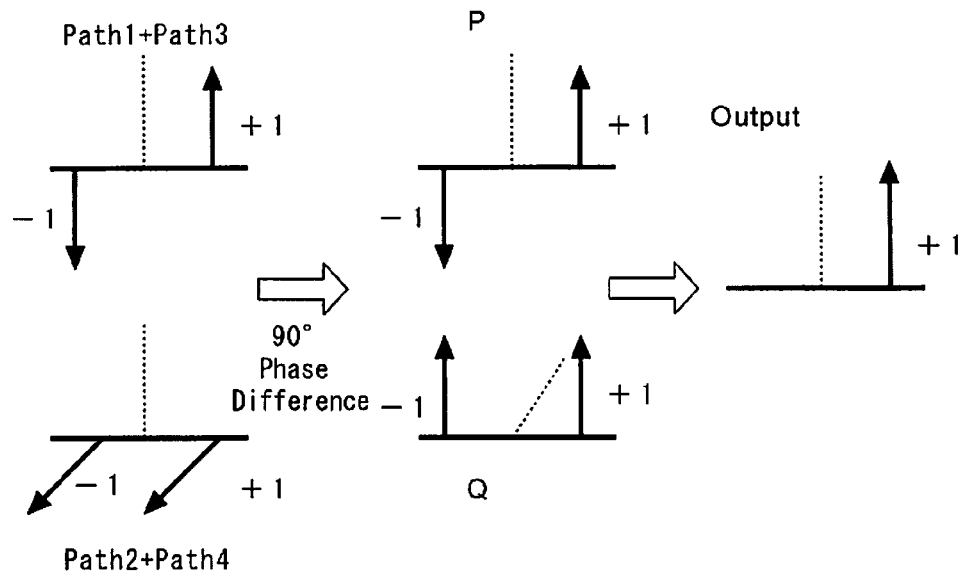
FIG. 6 is a conceptual diagram showing optical signals and its phases in each part of an ideal optical FSK modulator (or an optical SSB modulator).

FIG. 6 is a conceptual diagram showing optical signals and its phases in each part of an ideal optical FSK modulator (or an optical SSK modulator). As shown in FIG. 6, a carrier and the like are ideally suppressed, and at point P and point Q of FIG. 1, LSB signals from the $MZ_A$ and the $MZ_B$ are adjusted to be in opposite phase. The signals adjusted in this way are combined at the combining part (6) where the LSB elements cancel each other and the USB elements remain. On the other hand, if the phase difference of the output signal from the electrode C is adjusted to be 270°, the USB signals cancel each other and the LSB signals remain.

Figure 7:
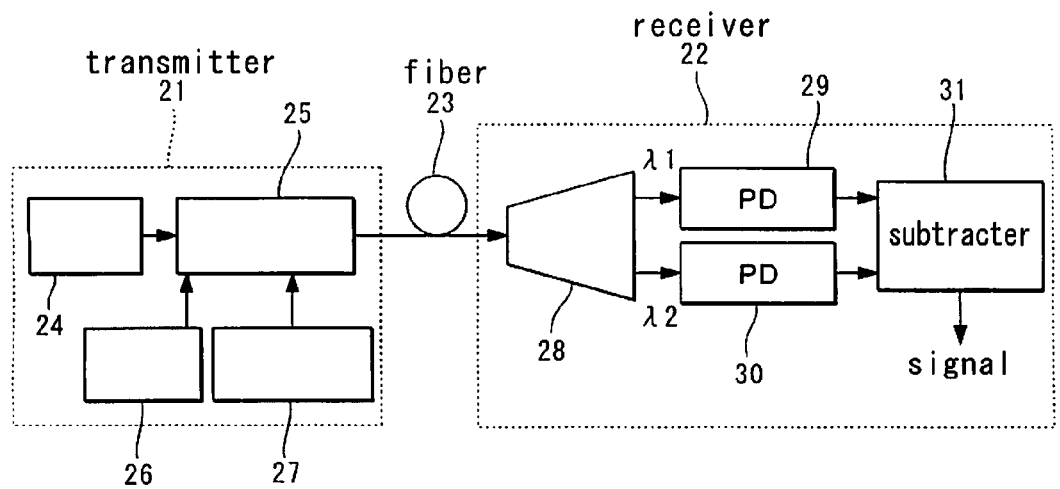
FIG. 7 is a conceptual diagram showing FSK signals (LSB signals) considering phase differences.

FIG. 7 is a conceptual diagram showing FSK signals (USB signals and LSB signals) considering the phase. FIG. 7 shows the way an LSB signal is obtained. In this example, there is a phase lag of 180° between the USB signal of FIG. 6 and the LSB signal of FIG. 4. The FSK signal is based on the frequency shift information. Therefore, what is concerned is a frequency position, and the final phase of the FSK signal (USB signal or LSB signal) does not matter. In fact, as shown in FIG. 7, the phase of the USB signal and that of the LSB signal do not match.

For example, in case of phase lag between the phase of the LSB signal and that of the USB signal, the LSB signal or the USB signal is selected by the modulation signal applied to the main MZ electrode. Therefore, in order to adjust the phases of the LSB signal and the USB signal, it is only necessary to adjust the signal source so that the signal source adjusts bias voltage applied to the main MZ electrode based on the modulation signal.

In order to adjust the signal source this way, for example, if the control device, such as a computer that is connected to the signal source, applies bias voltage in selecting the USB signal, it is only necessary for the control device to output directional information for applying predetermined bias voltage as well as directional information for selecting the USB signal as a modulation signal to the signal source of the bias voltage and the high frequency signal source for the modulation signal etc. respectively.

Each signal source, having received the directional information and following the direction, applies a modulation signal, which outputs the USB signal, to the main MZ electrode. And the each signal source also applies a signal, which applies a predetermined bias voltage, to the main MZ electrode. By this way, a signal is selected and the phase of the USB signal and that of the LSB signal is adjusted (preferably in the same level).

The optical modulator of the present invention can be used effectively in the field of optical information communication.

What is claimed is:
1. An optical modulator comprising:
a first sub Mach-Zehnder waveguide ($MZ_A$) (2);
a second sub Mach-Zehnder waveguide ($MZ_B$) (3);
a main Mach-Zehnder waveguide ($MZ_C$) (8) including:
an input part (4) of an optical signal,
a diverging part (5), the diverging part (5) being configured to be connected to the input part, wherein the optical light is diverged at the diverging part into the first sub Mach-Zehnder waveguide ($MZ_A$) and the second sub Mach-Zehnder waveguide ($MZ_B$),
the first sub Mach-Zehnder waveguide ($MZ_A$),
the second sub Mach-Zehnder waveguide ($MZ_B$),
a combining part (6) combining the optical signal outputted from the first sub Mach-Zehnder waveguide ($MZ_A$) and the second sub Mach-Zehnder waveguide ($MZ_B$), the combining part being configured to being connected to the first sub Mach-Zehnder waveguide ($MZ_A$) and the second sub Mach-Zehnder waveguide ($MZ_B$),
an output part (7) outputting the optical signal combined in the combining part, the output part being configured to connected to the combining part;
a first electrode (electrode A) (9) of the first sub Mach-Zehnder waveguide ($MZ_A$);
a second electrode (electrode B) (10) of the second sub Mach-Zehnder waveguide ($MZ_B$);
a main Mach-Zehnder electrode (electrode C) (11) of the main Mach-Zehnder waveguide ($MZ_C$);
a signal source (12) for applying either one or both of a modulation signal and a bias voltage to the first electrode (9), the second electrode (10) and the main Mach-Zehnder electrode (11);
a first bias adjusting means for adjusting bias voltage, the bias voltage being applied to the electrode A and the electrode B, the bias voltage being adjusted so as to maximize an intensity of the optical signal outputted from the main Mach-Zehnder waveguide; and
a second bias adjusting means for adjusting bias voltage, the bias voltage being applied to the electrode C, the bias voltage being adjusted so that, when the intensity of the optical signal is represented by Max, an intensity of the optical signal is in between 40% to 60%, both inclusive, of the Max, while the bias voltage applied to the electrode A and the electrode B is kept to be the same level as the one obtained in the first bias adjusting means.

2. The optical modulator as claimed in claim 1, wherein the second bias adjusting means is a bias adjusting means for adjusting the bias voltage applied to the main MZ electrode so that the intensity of the optical signal outputted from the main Mach-Zehnder waveguide falls to half of the Max.

3. The optical modulator as claimed in claim 1, wherein the optical modulator controls a phase of an output signal by bias voltage, the bias voltage being applied to the main Mach-Zehnder electrode.

4. An optical modulator comprising:
a first sub Mach-Zehnder waveguide ($MZ_A$) (2);
a second sub Mach-Zehnder waveguide ($MZ_B$) (3);
a main Mach-Zehnder waveguide ($MZ_C$) (8) including:
an input part (4) of an optical signal,
a diverging part (5), the diverging part (5) being configured to connected to the input part, wherein the optical light is diverged at the diverging part into the first sub Mach-Zehnder waveguide ($MZ_A$) and the second sub Mach-Zehnder waveguide ($MZ_B$),
the first sub Mach-Zehnder waveguide ($MZ_A$),
the second sub Mach-Zehnder waveguide ($MZ_B$),
a combining part (6) combining the optical signal outputted from the first sub Mach-Zehnder waveguide ($MZ_A$) and the second sub Mach-Zehnder waveguide ($MZ_B$), the combining part being configured to being connected to the first sub Mach-Zehnder waveguide ($MZ_A$) and the second sub Mach-Zehnder waveguide ($MZ_B$),
an output part (7) outputting the optical signal combined in the combining part, the output part being configured to connected to the combining part;
a first electrode (electrode A) (9) of the first sub Mach-Zehnder waveguide ($MZ_A$);
a second electrode (electrode B) (10) of the second sub Mach-Zehnder waveguide ($MZ_B$);
a main Mach-Zehnder electrode (electrode C) (11) of the main Mach-Zehnder waveguide ($MZ_C$);
a signal source (12) for applying either one or both of a modulation signal and a bias voltage to the first electrode (9), the second electrode (10) and the main Mach-Zehnder electrode (11):
a first bias adjusting means for adjusting bias voltage, the bias voltage being applied to the electrode A and the electrode B, the bias voltage being adjusted so as to maximize an intensity of the optical signal outputted from the main Mach-Zehnder waveguide; and a third bias adjusting means, the third bias adjusting means applying a dithering signal as a bias voltage to the main Mach-Zehnder electrode, the third bias adjusting means adjusting bias voltage of the main Mach-Zehnder electrode so that an intensity of a dithering signal element is maximized, while the bias voltage applied to the sub Mach-Zehnder waveguide is kept to be the same level as the one obtained in the first bias adjusting means.

5. A bias voltage adjusting method using an optical modulator, the optical modulator comprising: a first sub Mach-Zehnder waveguide ($MZ_A$) (2); a second sub Mach-Zehnder waveguide ($MZ_B$) (3); a main Mach-Zehnder waveguide ($MZ_C$) (8) including: an input part (4) of an optical signal, a diverging part (5), the diverging part (5) being configured to connected to the input part, wherein the optical light is diverged at the diverging part into the first sub Mach-Zehnder waveguide ($MZ_A$) and the second sub Mach-Zehnder waveguide ($MZ_B$), the first sub Mach-Zehnder waveguide ($MZ_A$), the second sub Mach-Zehnder waveguide ($MZ_B$), a combining part (6) combining the optical signal outputted from the first sub Mach-Zehnder waveguide ($MZ_A$) and the second sub Mach-Zehnder waveguide ($MZ_B$), the combining part being configured to being connected to the first sub Mach-Zehnder waveguide ($MZ_A$) and the second sub Mach-Zehnder waveguide ($MZ_B$), an output part (7) outputting the optical signal combined in the combining part, the output part being configured to connected to the combining part; a first electrode (electrode A) (9) of the first sub Mach-Zehnder waveguide ($MZ_A$); a second electrode (electrode B) (10) of the second sub Mach-Zehnder waveguide ($MZ_B$); a main Mach-Zehnder electrode (electrode C) (11) of the main Mach-Zehnder waveguide ($MZ_C$); a signal source (12) for applying either one or both of a modulation signal and a bias voltage to the first electrode (9), the second electrode (10) and the main Mach-Zehnder electrode (11); a first bias adjusting means for adjusting bias voltage, the bias voltage being applied to the electrode A and the electrode B, the bias voltage being adjusted so as to maximize an intensity of the optical signal outputted from the main Mach-Zehnder waveguide; and a second bias adjusting means for adjusting bias voltage the bias voltage being applied to the electrode C, the bias voltage being adjusted so that, when the intensity of the optical signal is represented by Max, an intensity of the optical signal is in between 40% to 60%, both inclusive of the Max, while the bias voltage applied to the electrode A and the electrode B is kept to be the same level as the one obtained in the first bias adjusting means, the bias voltage adjusting method comprising: a first bias adjusting step of adjusting bias voltage of each MZ waveguide, the bias voltage being adjusted so as to maximize an intensity of the optical signal outputted from the main Mach-Zehnder waveguide; and a second bias adjusting step of adjusting bias voltage, the bias voltage being applied to the main Mach-Zehnder electrode, the bias voltage being adjusted so that, when the intensity of the optical signal observed in the first bias adjusting step is represented by Max, an intensity of the optical signal outputted from the main Mach-Zehnder waveguide is in between 40% to 60%, both inclusive, of the Max, while the bias voltage applied to the each sub Mach-Zehnder waveguide is kept to be the same level as the one obtained in the first bias adjusting step.

6. A bias voltage adjusting method using an optical modulator
the optical modulator comprising:
a first sub Mach-Zehnder waveguide ($MZ_A$) (2);
a second sub Mach-Zehnder waveguide ($MZ_B$) (3);
a main Mach-Zehnder waveguide ($MZ_C$) (8) including:
  an input part (4) of an optical signal,
  a diverging part (5), the diverging part (5) being configured to connected to the input part, wherein the optical light is diverged at the diverging part into the first sub Mach-Zehnder waveguide ($MZ_A$) and the second sub Mach-Zehnder waveguide ($MZ_B$),
  the first sub Mach-Zehnder waveguide ($MZ_A$),
  the second sub Mach-Zehnder waveguide ($MZ_B$),
  a combining part (6) combining the optical signal outputted from the first sub Mach-Zehnder waveguide ($MZ_A$) and the second sub Mach-Zehnder waveguide ($MZ_B$), the combining part being configured to being connected to the first sub Mach-Zehnder waveguide ($MZ_A$) and the second sub Mach-Zehnder waveguide ($MZ_B$),
  an output part (7) outputting the optical signal combined in the combining part, the output part being configured to connected to the combining part;
a first electrode (electrode A) (9) of the first sub Mach-Zehnder waveguide ($MZ_A$);
a second electrode (electrode B) (10) of the second sub Mach-Zehnder waveguide ($MZ_B$);
a main Mach-Zehnder electrode (electrode C) (11) of the main Mach-Zehnder waveguide ($MZ_C$);
a signal source (12) for applying either one or both of a modulation signal and a bias voltage to the first electrode (9), the second electrode (10) and the main Mach-Zehnder electrode (11);
a first bias adjusting means for adjusting bias voltage, the bias voltage being applied to the electrode A and the electrode B, the bias voltage being adjusted so as to maximize an intensity of the optical signal outputted from the main Mach-Zehnder waveguide; and
a second bias adjusting means for adjusting bias voltage, the bias voltage being applied to the electrode C, the bias voltage being adjusted so that, when the intensity of the optical signal is represented by Max, an intensity of the optical signal is in between 40% to 60%, both inclusive, of the Max, while the bias voltage applied to the electrode A and the electrode B is kept to be the same level as the one obtained in the first bias adjusting means,
the bias voltage adjusting method comprising:
a first bias adjusting step of adjusting bias voltage of each MZ waveguide, the bias voltage being adjusted so as to maximize an intensity of the optical signal outputted from the main Mach-Zehnder waveguide; and
a third bias voltage adjusting step for adjusting bias voltage of the main Mach-Zehnder electrode, the main Mach-Zehnder electrode being applied a dithering signal as a bias voltage, the bias voltage being adjusted so as to maximize an intensity of a dithering signal element, while the bias voltage applied to the sub Mach-Zehnder waveguide is kept to be the same level as the one obtained in the first bias adjusting step.

* * * * *